United States Patent [19]
McWilliams

[11] 3,836,021
[45] Sept. 17, 1974

[54] APPARATUS FOR HANDLING MAIL BAGS
[76] Inventor: Joseph E. McWilliams, 1345 Canterbury Ln., Glenview, Ill. 60025
[22] Filed: Oct. 5, 1972
[21] Appl. No.: 295,261

[52] U.S. Cl................................. 214/41, 198/37
[51] Int. Cl....................... B65g 57/12, B65g 67/08
[58] Field of Search.......................... 214/41; 198/37

[56] References Cited
UNITED STATES PATENTS
2,150,211  3/1939  Edwards........................... 214/41 X
2,208,208  7/1940  Brooks............................. 214/41 X Primary Examiner—Robert G. Sheridan
Attorney, Agent, or Firm—Mann, Brown, McWilliams & Bradway

[57] ABSTRACT

Apparatus for loading mail bags from a loading dock, equipped with a chute from which the bags are gravity discharged, into an end loading highway vehicle, comprising a mail bag storing conveyor that receives the bags as they are dropped at random from the chute, and is activated by sensing device when the bags have reached a predetermined level on the conveyor to shift the bags already loaded so that further bags may be applied to the storage conveyor, with the storage conveyor being equipped with sensing devices at its ends that are connected with means to signal the operator when the storage conveyor is fully loaded so that it may be unloaded.

10 Claims, 12 Drawing Figures

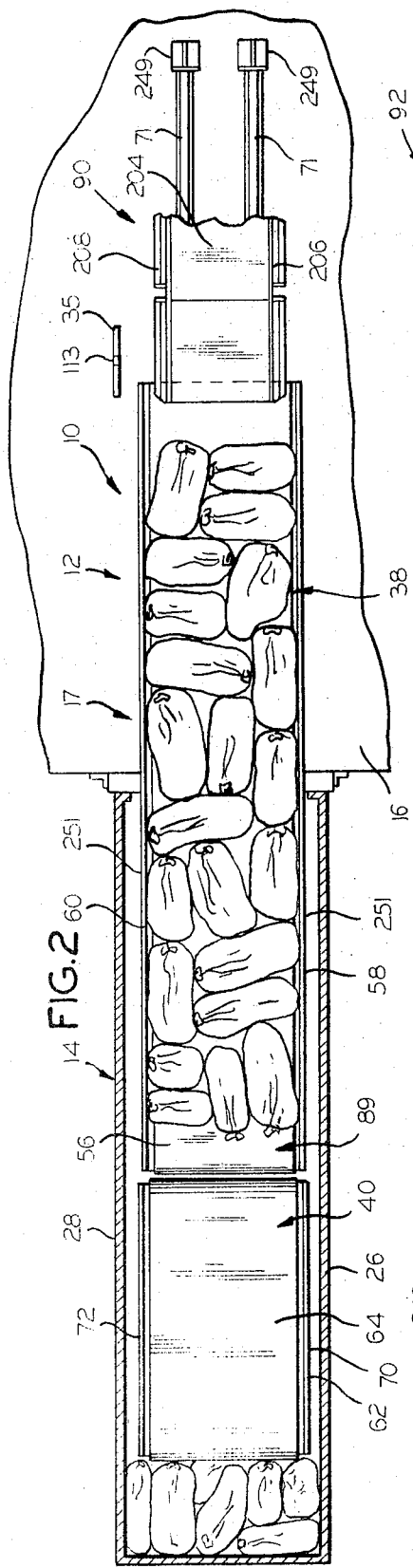
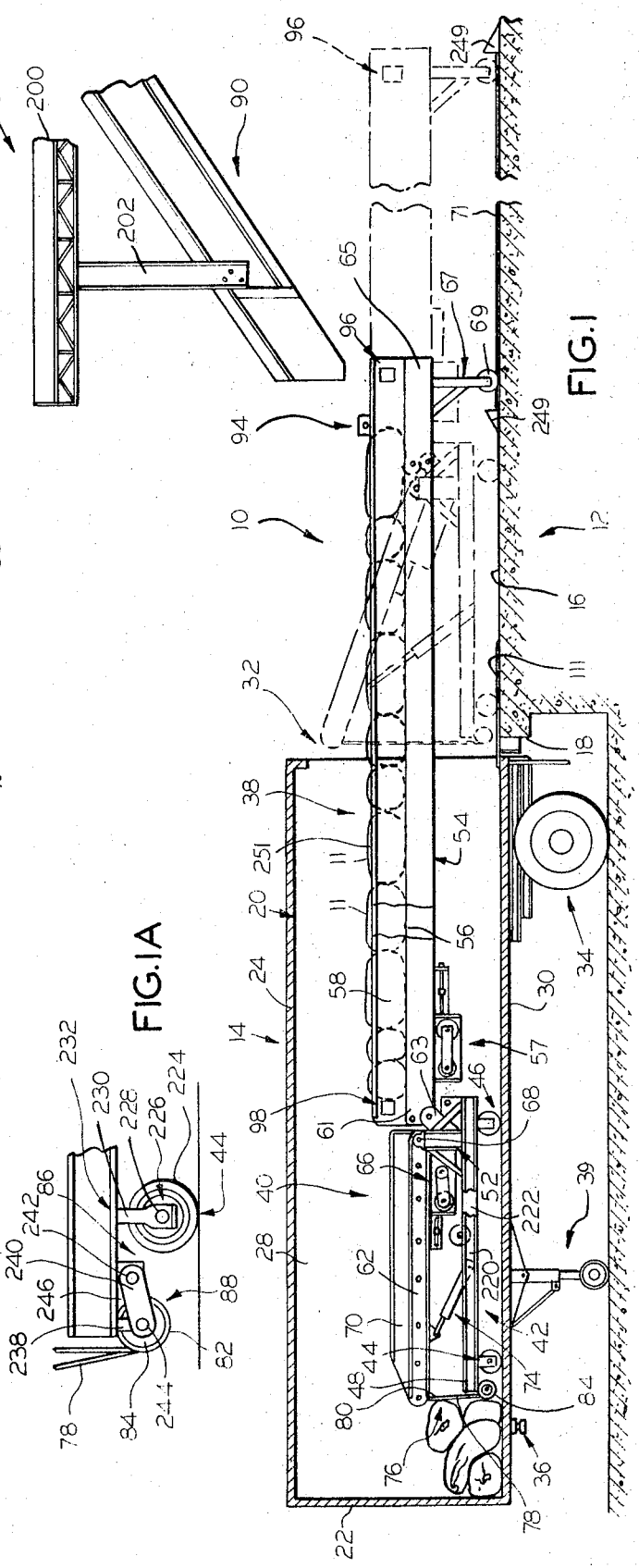

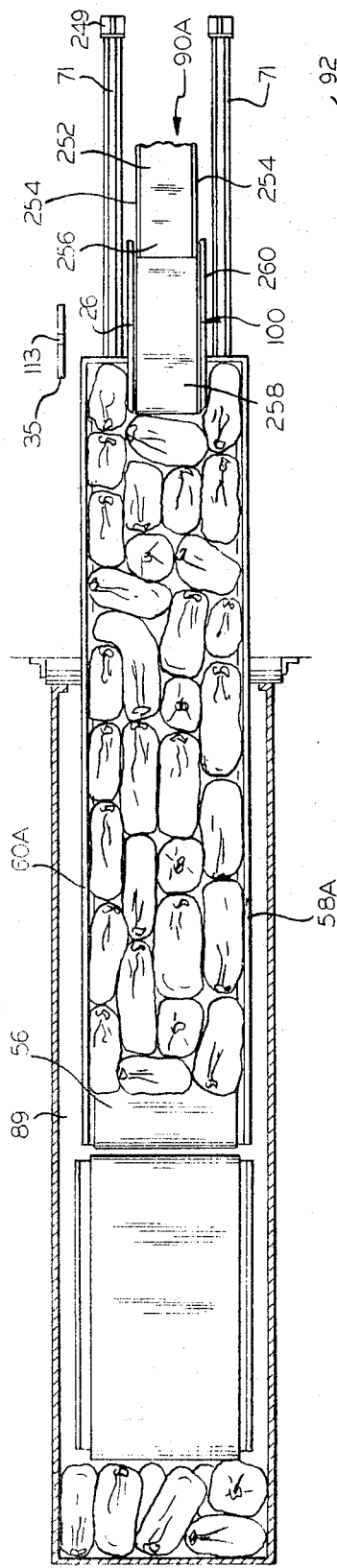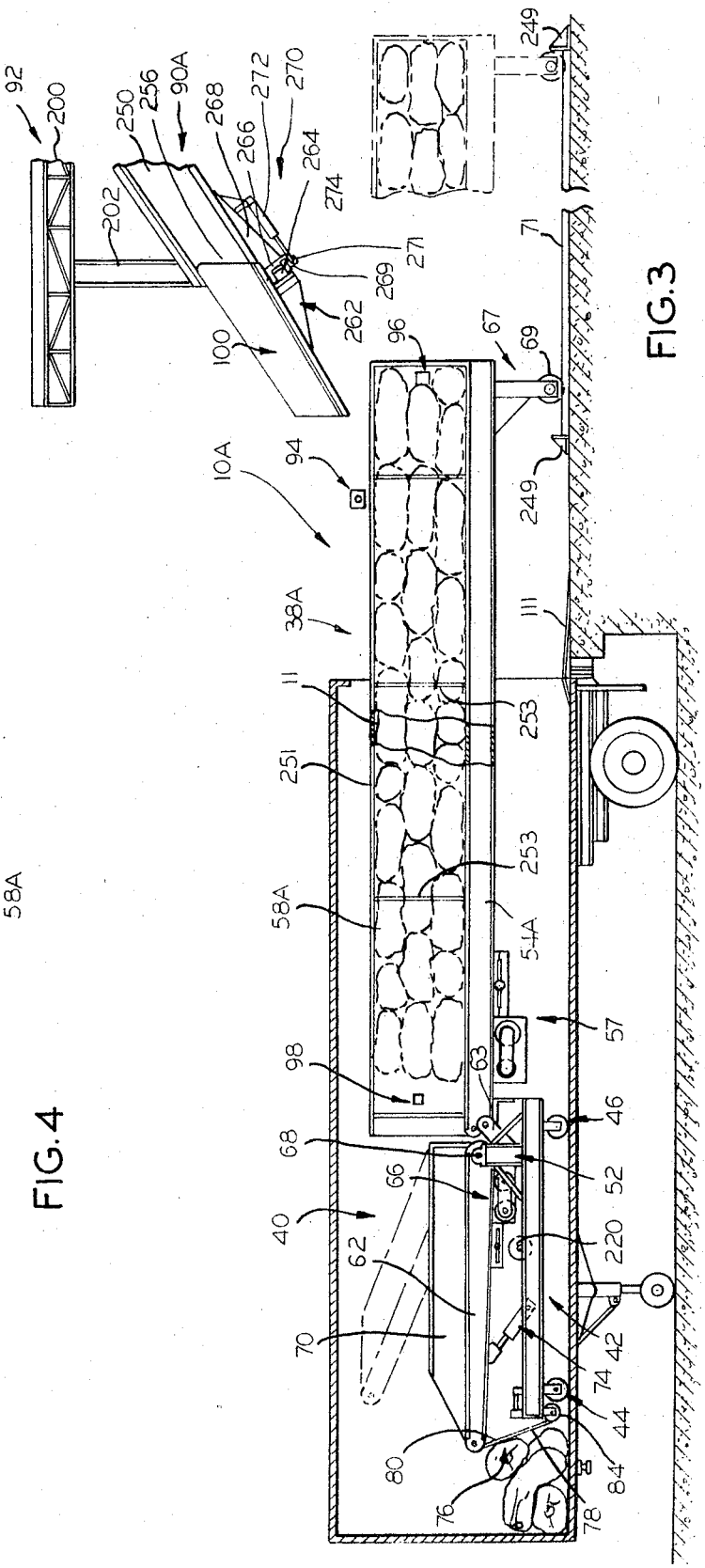

APPARATUS FOR HANDLING MAIL BAGS

This invention relates to a method and apparatus for loading mail bags from a loading dock into a highway vehicle, and more particularly, to a method and apparatus particularly adapted for use in connection with multiple bay type loading dock facilities and permits a single operator to service a number of adjacent bays.

An existing arrangement for mass processing of bagged mail for segregating same and loading same into highway vehicles for transportation purposes is to have a multiple bay loading dock arrangement in which the individual bays each have their own bag supplying chute, with the bags being delivered from a sorting machine and deflected into the respective chutes by a deflector arrangement. The chutes extend downwardly from an overhead structure, and the bags are delivered by the chutes for manual loading onto nutting trucks (which is the technical name for the familiar mail bag handling hand truck) on the loading dock which are wheeled into the waiting end loading highway vehicles for loading into the vehicle by hand.

A principal object of this invention is to provide a mail bag handling and conveying arrangement which avoids manual handling of the bags from the time they are delivered by the chutes to the time they are fully loaded into the highway vehicle.

Another principal object of the invention is to provide a mail bag handling and conveying arrangement for each bay which temporarily stores the bags as they leave the chute for that bay on a power conveyor apparatus that collects them for later mechanical conveying into the vehicle.

Other objects of the invention are to provide a mail bag storage conveyor arrangement that is supplemental to the mail bag loading apparatus of my application Ser. No. 275,790, filed July 27, 1972, and arranged so that a single operator can service a number of bays equipped with such equipment, to improve the arrangement of said application for ready transfer of same between individual bays and their mail bag storage conveyors, and to provide a mail bag handling apparatus that is economical of manufacture, convenient to use, and long lived in operation.

In accordance with this invention, the mail bag receiving conveyor of my said application that is operably associated with the propelling or bag positioning conveyor thereof, is in the form of a bag storing conveyor that operates under the indicated bag discharge chute of the respective bays. The storage conveyor is operably associated with sensing means that senses the piling up of bags on the storage conveyor to a predetermined height, which sensing means actuates the storage conveyor to shift the bags longitudinally thereof to provide more room to receive additional bags from the chute. The storage conveyor further includes sensing means at its ends that is actuated when the bags received in the storage conveyor reach the end of the conveyor, and the latter sensing means is operably associated with a suitable means for signaling the operator that it is time to unload the storage conveyor.

The storage conveyor may be permanently secured to a mail bag propelling or positioning conveyor of the type shown in said application, in which case one such propelling and positioning conveyor is required for each bay, or in accordance with this invention, the propelling and positioning conveyor is arranged for lateral transfer between bays so that one such piece of equipment may service a number of such bays.

Other objects, uses, and advantages will be obvious or become apparent from a consideration of the following detailed description and the application drawings.

In the drawings:

FIG. 1 is a diagrammatic side elevational view of a semi-trailer in the process of being loaded in accordance with this invention, with the semi-trailer and adjacent loading dock facilities being shown in section, and a dashed line showing of the invention involved being provided to indicate the load receiving position of the storage conveyor of this invention when the mail bag handling apparatus is fully withdrawn from the highway vehicle, and the full line position illustrated indicating the mail bag storage and propelling apparatus positioned for loading of the bags into the forward end of the highway vehicle;

FIG. 1A is a fragmental elevational view of one of the drive wheels of the apparatus;

FIG. 2 is a plan view of the apparatus shown in FIG. 1, with the highway vehicle being shown in horizontal section;

FIG. 3 is a view similar to that of FIG. 1 illustrating a modified form of the invention;

FIG. 4 is a view similar to that of FIG. 2 but illustrating the embodiment shown in FIG. 3;

Figure 5:
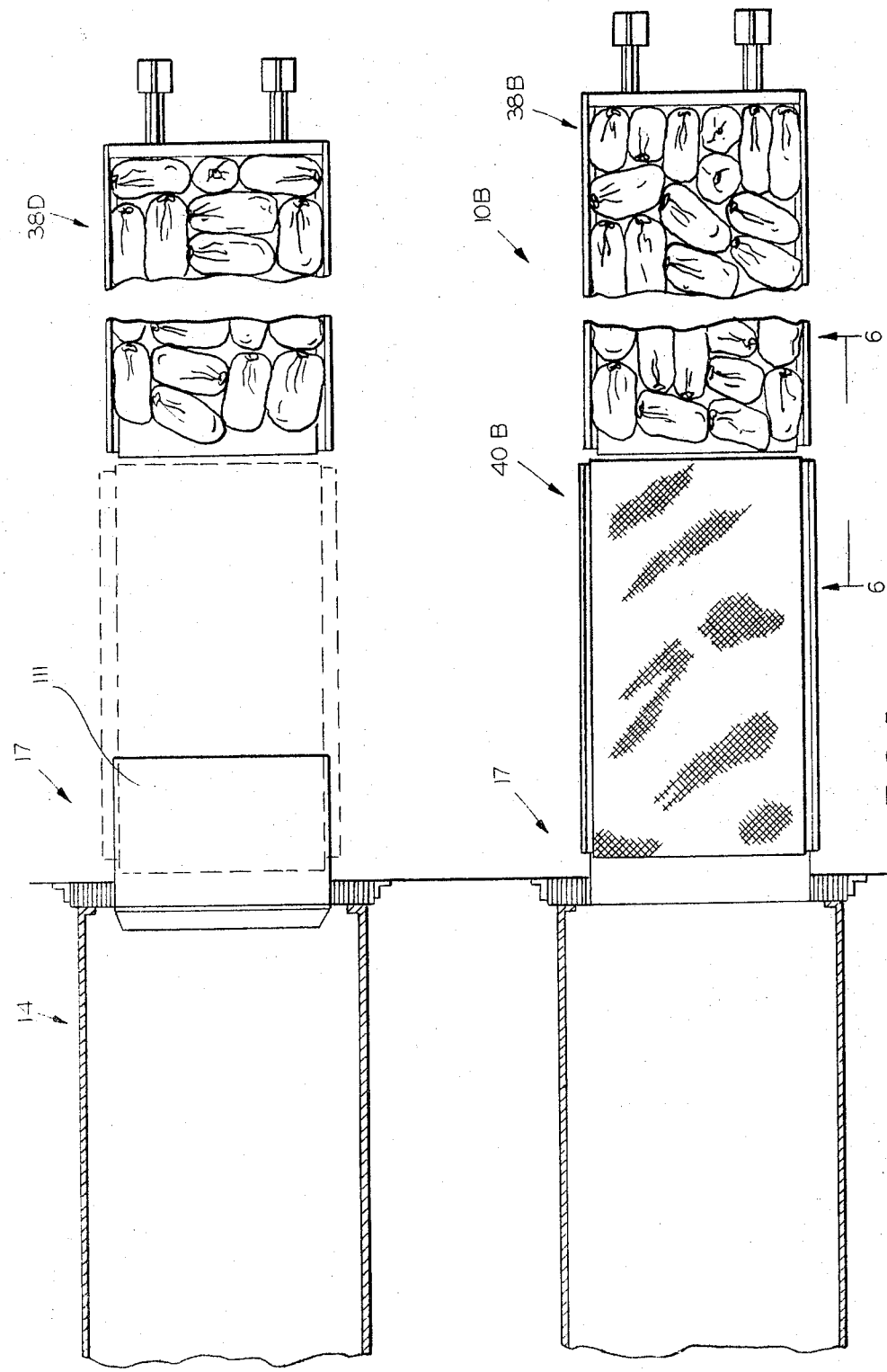
FIG. 5 is a plan view, on a somewhat enlarged scale, of two adjacent loading bays equipped with a bag storing conveyor in accordance with this invention and a laterally movable bag loading conveyor, of the general type shown in my said application, but as modified in accordance with the present invention, for servicing both bays.
Figure 7:
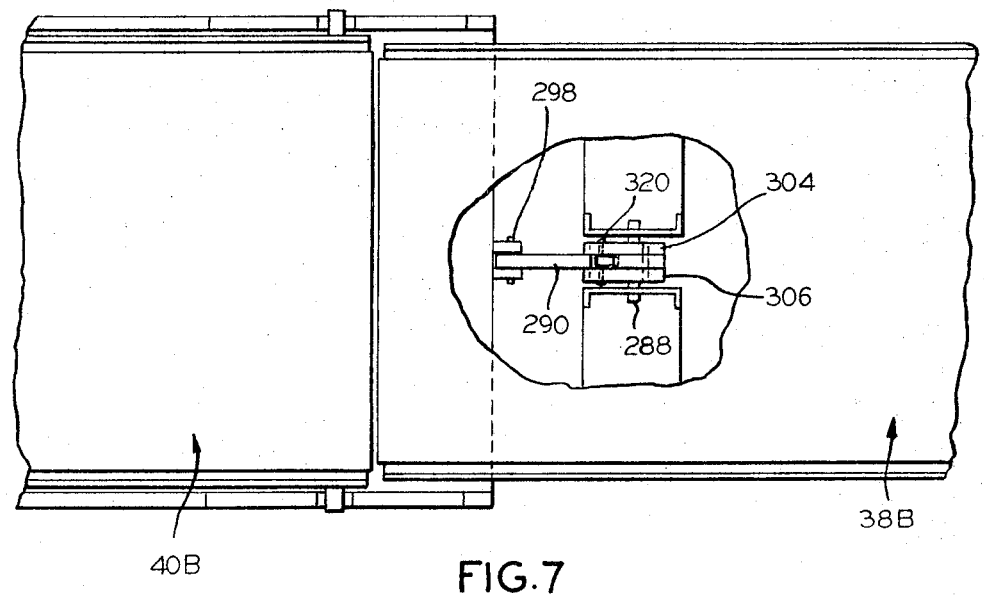
FIG. 7 is a plan view of the apparatus shown in FIG. 6, with parts broken away.

However, it is to be distinctly understood that the specific drawing illustrations provided are supplied primarily to comply with the requirements of the Patent Laws, and that the invention is susceptible to other embodiments that will be obvious to those skilled in the art, and which are intended to be covered by the appended claims.

GENERAL DESCRIPTION

Reference numeral 10 of FIGS. 1 and 2 generally indicates one embodiment of the present invention for loading mail bags from a loading dock 12 into an end loading highway vehicle 14, which vehicle 14 has been illustrated as being in the form of the familiar semitrailer, although the invention is readily applicable to any end loading vehicle proportioned to receive the apparatus 10 in the manner indicated in the drawings.

It is assumed that the mail bag handling installations involved include the loading dock 12 (of a post office or the like) that is conveniently provided with a level load support surface 16 and the usual shoulder or end 18 to which the vehicle is backed up to a bay 17 for purposes of being loaded.

It is also assumed that the vehicle 14 is in the form of the usual body 20 defined by forward end wall 22, top wall 24, side walls 26 and 28, floor 30, and end opening 32 that is customarily closed by suitable doors or the like (not shown). The body 20 being of the semi-trailer type rides on the usual rear wheels 34, and is provided with the usual kingpin 36 for connection to the fifth wheel of a conventional tractor truck (not shown). When disconnected from the tractor truck, the vehicle 14 rests on suitable retractable props 39 adjacent its forward end.

In accordance with the general arrangement disclosed in my said application, the apparatus 10 is associated with the bay 17 and comprises a mail bag receiving conveyor 38 and a mail bag loading conveyor 40, which also may be termed a loader head.

The mail bag loading conveyor 40 is arranged essentially in accordance with the disclosure of my said application and comprises a wheeled frame 42 riding on hydraulically driven wheels 44 and 46 at the respective ends 48 and 50 of frame 42, with frame 42 being provided with an upright support structure 52 on which conveyor frame 62 is mounted. Conveyor 38 generally comprises a frame 54 on which suitable conveyor belt 56 is trained and driven by suitable power drive 57, and includes guide walls or panels 58 and 60 suitably affixed to the frame 54 and extending along either side of the conveyor belt 56 to keep the mail bags 11 that are being conveyed by the conveyor 38 from spilling or dropping over either side of the conveyor 38. Frame 54 is mounted at its forward end 61 of same between spaced support arms 63 that are suitably affixed to the wheeled frame 42. The rear end 65 of the frame 54 is supported at either side of same on a leg structure 67 journaling a wheel 69 riding in a trackway 71.

The conveyor 40 comprises the frame 62 over which high speed propelling belt 64 is trained, which belt is driven by a suitable power drive 66. Frame 62 is suitably mounted or journaled at its rear end on the support structure 52 for swinging about horizontal axis 68, and has secured to the side of same guide walls or panels 70 and 72 for guiding mail bags being conveyed by the belts 64. Frame 62 is supported by one or more power operated extensible and contractable prop devices 74 which operate to shift the forward end of the frame 62 vertically to move the frame 62 between horizontal, upwardly inclined, and downwardly inclined posiitons suitable for best fling loading of the mail bags 11 into the highway vehicle forwardly of the conveyor 40, as described in said application.

As further disclosed in my said application, operably interconnected between the forward end of the frame 62 and the forward end 48 of wheeled frame 42 is a roll up type bag damming or restraining baffle device 76, which comprises a flexible sheet 78 that may be in the form of belting or the like, having its end 80 suitably anchored ot the forward end of frame 62, and its other end suitably anchored to roller 84 that is suitably journaled on frame 42 and driven by suitable hydraulic motor (not shown) in the manner described in said application. The drive arrangement for the roller 84 is such that a constant torque of low value is applied to the roller 84 in the direction that would wind up sheet 78 if no restraint to wind up is placed on the sheet 78, but which will permit unwinding of the sheet 78 from the roller 84 as the frame 62 moves about axis 68 to dispose the forward end of frame 62 upwardly of the frame 42 relative to the horizontal position shown in the drawings. The drive for the roller 84 also maintains sufficient tension on the sheet 78 to accomplish the objectives of serving as a mail bag dam or restraining means to prevent rebound of mail bags rearwardly of the forward end of the frame 52 as the bags are being loaded into the vehicle 14 from conveyor 40.

Conveyors 38 and 40 together provide an upwardly facing substantially continuous load supporting surface 89 that is proportioned to substantially span the transverse dimension of the load receiving area of vehicle 14 (see FIG. 2).

In accordance with this invention, the apparatus 10 is operably associated with a gravity discharge chute structure 90 supported by a suitable overhead structure 92 built above the loading dock 12 through which is discharged mail bags proceeding from the mail bag sortation system located at the facility of which loading dock 12 forms a part. Convention sortation systems of this type involve a conveyor system that conveys the sorted bags from the system and includes a means of deflecting or discharging mail bags at the chutes 90 for each way 17 in accordance with the bags that are to be loaded at any particular way 17.

Further in accordance with this invention, the conveyor 38 is arranged so that its conveyor belt 56 moves a predetermined amount when mail bags discharging from the chute 90 pile up to a predetermined level, so as to expose further supporting surface 59 of belt 56 for receiving additional mail bags. In accordance with one aspect of this development, the apparatus 10 is arranged so that it may park in the dashed line position of FIG. 1 to await a vehicle 14, and in the meantime receive mail bags from a chute 90. For this purpose, a suitable sensing device, such as an electric eye or its equivalent, is applied approximately where indicated by reference numeral 94 of FIG. 1 to sense when the mail bags 11 have been discharged from chute 90 to the extent that when the bags trigger the sensing device, the sensing device is operative to actuate conveyor 56 (through any suitable control means), whereby the upper run of the conveyor 56 is moved to the right of FIG. 1 to move the bags then received on the conveyor 56 to a position beneath and to the right of chute 90 so as to position further additional open space on the conveyor 56 for receiving random discharge of bags 11 from chute 90. This continues until the bags carried by the belt 56 have moved sufficiently to the right of FIG. 1 to actuate sensing device 96 (which also may be in the form of an electric eye or its equivalent) at the end 65 of conveyor 38, which in accordance with this invention, actuates through suitable means a signal, such as a red light, a bell or a buzzer, that advises the attendant that the conveyor 38 is ready to be unloaded.

When a highway vehicle 14 is moved to the position of FIGS. 1 and 2, the apparatus 10 is moved to the full line position of FIG. 1, and the conveyors 38 and 40 are put into operation, the belt 56 being driven at a speed of about 200 feet per minute while the belt 64 is driven at a speed of 550 feet per minute. The conveyor 40 is initially positioned substantially in a downwardly inclined position for directing the first mail bags toward the forward end of the vehicle and at the base of the forward wall 22. The bags 11 move across conveyor 38 by movement to the left of the upper run of belt 56 and are transferred to the high speed belt 64 which propells or flings them forwardly into loaded position on the floor of the car adjacent the juncture of the floor 30 and the forward wall 22.

As the mail bags pile up between dam device 76 and the end 22 of the vehicle 14, the forward end of conveyor 40 is raised to build up the resulting mail bag stack vertically, with the conveyor 40 being positioned at its upwardly inclined angulation for slinging bags between the upper end of the stack and the top wall or ceiling of the vehicle as described in said application. To start another stack of mail bags, the apparatus 10 is moved to the right of FIG. 1 an appropriate amount, and operation of conveyors 38 and 40 continued until conveyor 38 has been discharged.

The conveyor 38 is arranged so that after it is discharged, the apparatus 10 can remain within the vehicle 14 and receive further bags from chute 90, or receive them as it is being unloaded. As indicated in FIG. 1, the conveyor 38 is proportioned so that its rear end 65 is disposed in load receiving relation under the discharge end 96 of the chute 90, with the controls for operating the conveyor belt 56 then being set so that when the bags 11 pile up to actuate sensing device 94, the conveyor 56 moves to the left of FIG. 1 rather than to the right, and when the bags applied to the conveyor 56 have moved to the left sufficiently to actuate sensing device 98 (which may be of the same type as device 96) that is at the forward end 61 of the conveyor 38, suitable operator signaling means, such as the aforeindicated red light, bell or buzzer, is actuated to alert the attendant that conveyor 38 is in condition for further loading of the vehicle 14. Further loading of the vehicle 14 then proceeds in the manner already described, with the frame 62 being inclined as desirable for compact loading of the bags within the vehicle, and the apparatus 10 being moved rearwardly or to the right of FIG. 1 as the vehicle 14 is filled with bags.

Thus, storage conveyor 38 is always in position to receive bags from chute 90.

In the embodiment of FIGS. 1 and 2, the guide walls 58 and 60 are of relatively low height to accommodate a relatively low level distribution of the bags on belt 56 (basically one bag level in the form shown). In the embodiment 10A of FIGS. 3 and 4, the guide walls 58A and 60A of the storage conveyor 38A are of greater height, thus accommodating a higher piling of the bags on the storage conveyor 38A. Conveyor 10A is otherwise the same as conveyor 10. The chute 90A is shown to be of single bag transverse dimension in width, and is provided with a swiveling discharge end portion 100 for optimum distribution of the bags over the transverse dimension of conveyor 38A.

In the embodiment 10B of FIGS. 5 – 11, the storage conveyor 38B has its forward end 61B supported on its own wheel structure 110, and is provided with a cross bar structure 112 that is operably engaged by a latch device 114 carried by frame 42B of conveyor 40B, which is disposed to position the forward end 61B of the conveyor 38B closely adjacent the rearward end of the conveyor 40B.

Figure 8:
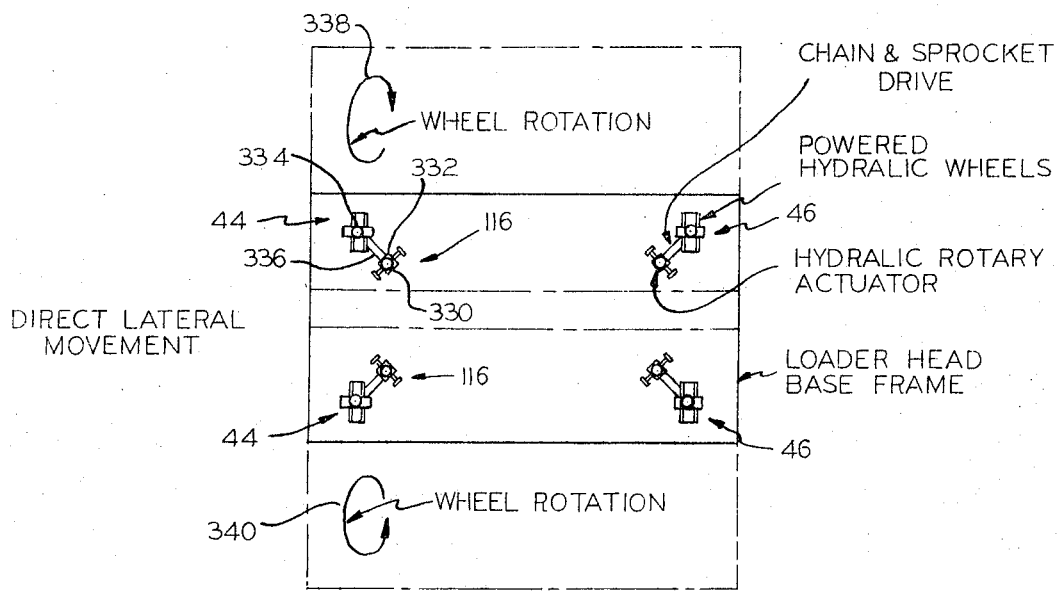
FIGS. 8 and 9 are diagrammatic top plan views illustrating the general nature of the supporting wheels for the bag loading conveyor and the manner in which they may be adjusted for moving the loading conveyor laterally or longitudinally thereof.
Figure 9:
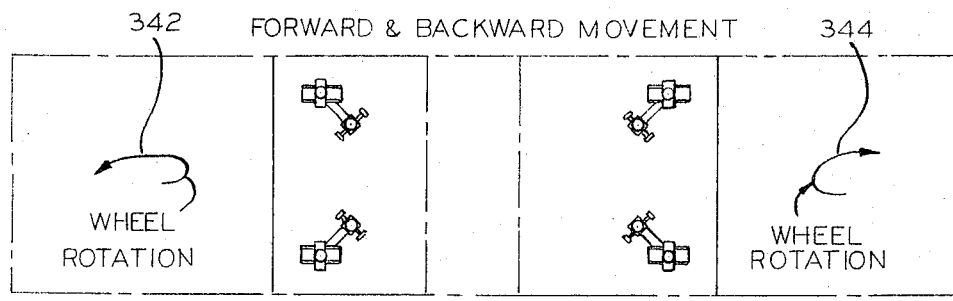
Figure 11:
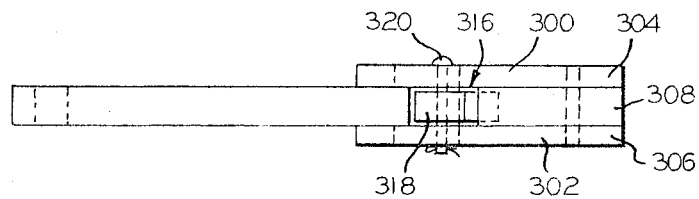
FIG. 11 is a plan view of the latch device shown in FIG. 10.

In addition, the hydraulically driven wheels 44 and 46 of the wheeled frame 42B are mounted (as they are for all embodiments of the invention) for pivotal movement about vertical axes by the separate actuator devices 116 that are indicated in FIGS. 8 and 9 to swing the respective drive wheels 44 and 46 between the respective positions indicated in FIGS. 8 and 9. When the wheels 44 and 46 are in the positions indicated in FIG. 8, and the loading conveyor 40B is disconnected from cross bar structure 112, the loading conveyor 40B may be moved laterally thereof between adjacent bays 17. Thus, with reference to the showing of the two bays 17 indicated in FIG. 5, the loading conveyor 40B may be moved from the full line position of FIG. 5 to the dashed line position of same for loading a highway vehicle 14 parked at bay 19. After the latch device 114 is connected to the cross bar structure of the storage conveyor 38B located at the second bay 17, and the power wheels 44 and 46 moved to the positions of FIG. 9, the power wheels 44 and 46 may be driven to move the apparatus 10B into the vehicle 14 for unloading of the mail bags contained in the second storage conveyor 38B.

After this conveyor 38B has been unloaded, the loading conveyor 40B may be returned to the original storage conveyor 38B shown in FIG. 5, or may be moved to another adjacent bay for servicing of the storage conveyor 38B of that bay.

SPECIFIC DESCRIPTION

The loading dock 12 that is illustrated is intended to be representative of conventional loading docks now commonly associated with post office installations or the like that include a number of adjacent bays 17.

The overhead structure 92 that supports the chute 90 may be of any suitable type, that indicated in the drawings including suitable framework 200 suspended in any suitable manner and carrying spaced apart supports 202 to which the lower end of the chute 90 is attached.

The chute 90 may be of any appropriate type defining inclined bottom wall structure 204 and side walls 206 and 208 that lead to chute discharge end 96. As indicated in FIG. 2, the chute 90 is proportioned transversely thereof to have a dimension that very closely approaches the width of conveyor belt 56 of the storage conveyor 38.

The vehicle 14 may be of any suitable standard type, that illustrated being intended to represent a typical vehicle now in use in connection with the transportation of bagged mail, though it is to be understood that the invention is equally applicable to other vehicles that are not of the semitrailer type.

Wheeled frame 42 of conveyor 40 in the form shown comprises a pair of longitudinally extending channel members 220 and 222 suitably affixed together in spaced apart relation by transverse members that are not shown, and suitably mounting the power wheels 44 and 46.

The power wheels 44 are two in number and spaced apart relation at the front end 48 of the frame 42 (although only one is illustrated in FIG. 1), and in the form shown each power wheel comprises a rim 224 (see FIG. 1A) suitably driven by a hydraulic power device 226 mounted within the rim 224 in a manner comparable or equivalent to conventional hydraulically driven conveyor rollers. The hydraulic drive mechanism 226 is journaled as at 228 within the arms 230 of a clevis structure 232 that is suitably journaled in frame 42 for movement about a vertical axis under the hydraulically actuated power mechanism 116. The other wheel 44 is similar, as are both power wheels 46, so that the wheels 44 and 46 may be rotated about their indicated vertical axes as necessary to properly steer the conveyor 40.

The sheets 78 of the roller dam device may take the form of conventional conveyor belting, and roller 84 is journaled between spaced bracket plates 238 (see FIG. 1A) suitably affixed to the respective frame members 220 and 222 of the wheeled frame 42. Hydraulic motor 86 may be of any suitable type and powers a drive chain operable where indicated at 240 that is trained over the respective sprockets 242 and 244 that are respectively keyed to the motor 86 and roller 84 for drive transmitting purposes. Drive chain 240 is covered by protecting shield 246.

Reference may be had to my said copending application for a more complete description of the features of conveyor 40 that are common to that disclosed here.

Frame 54 may be of any suitable type that journals suitable rollers, slider plates, and/or the like over which belt 56 is suitably trained, with belt 56 being suitably driven by suitable power drive 57 that has its controls operably associated with sensing devices 94, 96, and 98, in any suitable manner, to achieve the automatic and manual control that has been indicated. The rear support structures 67 are on either side of the frame 54 at its rearward end, and journal respective wheels 69 in any suitable manner. Trackways 71 in the form shown are of channel transverse cross-sectional configuration, and each is provided with wheel stops 249 at the ends of the respective trackways 71 to limit movement of the storage conveyor to a range that will keep it under chute 90 to receive bags being discharged therefrom. Of course, stops 249 may be removably mounted to permit further movement of apparatus 10 if so desired.

The guide walls 58 and 60 may be suitable metal plates reinforced at their upper ends by the curved edge portions 251. The members 58 and 60 are affixed to the frame 54 in any suitable manner.

Suitable bridge plate 111 (see FIG. 1) is employed to facilitate the transfer of the apparatus 10 between the loading dock and the vehicle. The operator controls for the conveyors 38 and 40 may be located suitably for convenient operator actuation, such as on a control panel 35 on which the aforementioned operator signaling device may be mounted where indicated at 113 (see FIG. 2).

The specifics of the embodiment 10A may be the same as those for the embodiment 10 except that the guide walls or panels 58A and 60A are of increased vertical height, and for this purpose are suitably reinforced by vertical frame members 253. The guide walls or panels 58A and 60A are affixed to the frame 54A in any suitable manner. Conveyor 38A is equipped with the sensing devices 94, 96 and 98 for the same purposes that are described in connection with the apparatus 10. Similar parts of the embodiment 10A relative to the embodiment 10 are indicated by corresponding reference numerals.

The chute structure 90A comprises a fixed or stationary chute 250 comprising bottom wall 252 and side walls 254 defining the usual chute configuration and a lower discharge end portion 256 to which the shiftably mounted chute discharge end 100 is secured. The chute discharge end 100 comprises a chute structure in the form of bottom wall 258 and side walls 260 applied to the end 256 of chute 250 in overlapping relation therewith and having a bracket structure 262 defining a lug 264 which is held in hinging relation with bifurcated lug structure 266 of bracket structure 268 affixed to the underside of chute 250 by pivot pin structure 269. The adjustable chute end 100 is shifted relative to chute 250 by suitable hydraulic cylinder device 270 having its cylinder 272 suitably swingably anchored to the chute 250, and its piston rod 274 suitably pivotally connected to an arm 271 of pin structure 269 (the latter being suitably keyed to lug 264).

Referring now to the embodiment 10B, the storage conveyor 38B is the same as storage conveyor 38A except for the front wheel support 110 and the cross bar structure 112. The front wheel support 110 may be of any suitable type, that illustrated comprising caster type wheel 280 (see FIG. 6) secured for the usual swinging movement about a vertical axis on the underside of the housing structure 282 of drive 57. Caster wheel 280 is preferably located in vertical alignment with the longitudinal center line of the conveyor 38, and while a single caster wheel 280 is shown, obviously the conveyor 38B may be arranged to have a pair of the wheels 380 supporting same in spaced apart relation transversely of the conveyor.

The cross bar structure 112 comprises a pair of depending bracket plates 284 and 286 suitably affixed to the frame 54A and mounting horizontal hitch bar 288 therebetween that extends transversely of conveyor 38B.

The latch device 114 generally comprises (see FIGS. 10 and 11) a latch member 290 having its end 292 apertured as at 294 for hinging connection to suitable lug structure 296 of the wheeled frame 42B, as by suitable pin 298. Latch member at its other end 299 has fixed thereto, as by welding, a pair of spaced apart plate elements 300 and 302, which are separated at their rearward ends 304 and 306 by spacer 308 (see FIG. 11) secured therebetween in any suitable manner, as by welding.

The plate elements 300 and 302 and their spacer 308 are formed to define on the under edges of same the latching recess 310 of the device 114 which includes a rearward hook portion 312 and a forward abutment portion 314. The plate elements 300 and 302 in the area of the abutment portion 314 define together with the end 299 of member 290 and spacer element 308 a trigger receiving space 316 in which trigger 318 is pivotally mounted by a suitable pin 320.

Figure 10:
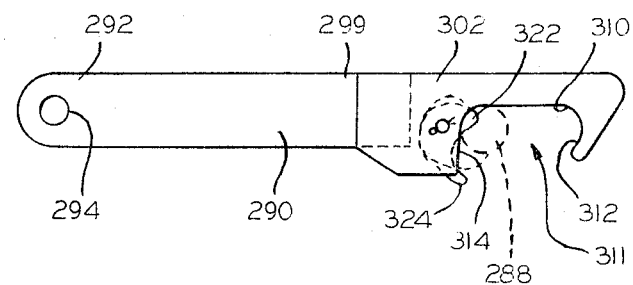
FIG. 10 is a view of the latch device employed in the embodiment of FIGS. 5 – 9 to releasably secure the mail bag loading conveyor to the mail bag storage conveyor.

Trigger 318 is of arcuate configuration defining projecting end portions 322 and 324, and is proportioned and pivoted such that under gravity the trigger assumes the full line position of FIG. 10 in which its end portion 322 projects from between the plate elements 300 and 302 into the latching space 311 defined by the latching configuration 310. Conveyor 40B is otherwise the same as conveyor 40.

Figure 6:
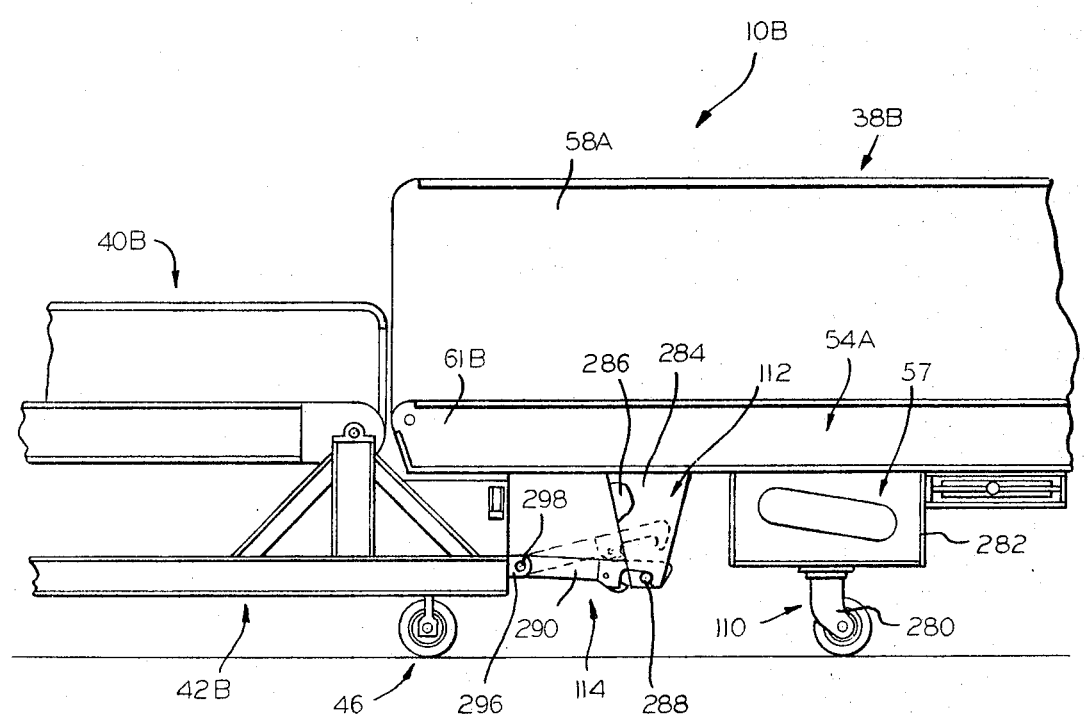
FIG. 6 is a side elevational view, on an enlarged scale, of the apparatus shown in FIG. 5, taken substantially along line 6—6 of FIG. 5, and indicating the manner in which the bag loading conveyor is connected to the storage conveyor.

Thus, when a conveyor 40B equipped with a latch device 114 is backed into latching relation with a conveyor 38B, as the conveyor 40B is backed toward the position indicated in FIG. 6, the latch device 114 may be raised to the dashed line position and then dropped to the full line position over bar 188. Movement of the conveyor 40B into the vehicle 14 involves engagement of the cross bar 288 with the hook portion 312 of device 114, and movement of the vehicle 40B rearwardly of the vehicle involves engagement of the connection bar 288 with trigger 318 and abutment portion 314 (as indicated in FIG. 10), the relative movement involved swinging the trigger 318 to its dashed line position of FIG. 10 so that its end 324 comes up underneath the cross bar 288 to hold the cross bar 288 against inadvertent disconnection from the device 114. When the conveyor 38B has been moved rearwardly to the extent desired to permit disconnection of the conveyor 40B if desired, the conveyor 40B is moved forwardly sufficiently to space the bar 288 from both the trigger 318 and hook portion 312, with the result that the trigger 318 returns under gravity to its full line position of FIG. 10 and the device 114 can be lifted free of bar 288 for further forward movement of the conveyor 40B relative to the conveyor 38B.

The conveyor 40B then may be moved sidewise or laterally thereof to an adjacent bay 17, as indicated in FIG. 5, by swinging the power wheels 44 and 46 in the manner indicated in FIGS. 8 and 9 and driving them in the direction necessary.

Referring now specifically to FIGS. 8 and 9, the actuators 116 basically may be of any suitable type comprising a spindle 330 having a sprocket 332 keyed thereto which cooperates with a similar sprocket 334 keyed to clevis structure 232, through drive chain 336. Spindle 330 is journaled in the actuating structure involved and suitably rotated at the demand of the operator operating suitable controls, and for this purpose the device 116 may be of the general type shown in U.S. Pat. Nos. 2,844,127, 2,844,128 and 3,246,581, to which reference may be had for specific descriptions of the devices of this type (one embodiment of which is sold under the trademark FLO-TORK by Flo-Tork Inc.). Actuators 116 may be suitably affixed to the undersides of conveyors 40 and 40B.

As indicated in FIG. 8, assuming it is desirable to move the conveyor 40B laterally thereof between bays, the wheels 44 and 46 are swung by devices 116 to the positions of FIG. 8, where they lie in planes extending laterally of the conveyor 40B. Operation of the wheels 44 and 46 in the direction indicated by the arrow 338 will move the conveyor 40B upwardly of the drawing (and thus sidewise of the conveyor or loader head), while operation of the wheels 44 and 46 in the direction indicated by the arrow 340 will move the vehicle in the opposite direction.

For movement of the vehicle 40B longitudinally thereof, the wheels 44 and 46 are swung to the positions indicated in FIG. 9, by operating the devices 116. Rotational movement of the wheels 44 and 46 in the direction indicated by the arrow 342 will move the conveyor 40B in the forward direction, while rotation of the said wheels in the direction indicated by the arrow 344 will move the conveyor 40B in the rearward direction.

The conveyor 40B has the same basic construction as conveyor 40, except for the application of latch device 114, as indicated by corresponding reference numerals. The connection of the conveyor 40B to the conveyor 38B should be such as to provide for the substantially continuous upwardly facing conveying surface 89, as indicated in FIG. 6.

It will therefore be seen that the storage feed type conveyor arrangement and laterally maneuverable mail bag loader apparatus provided by this invention greatly facilitates the mass handling of bagged mail by permitting a number of adjacent loading bays to be equipped with the conveyors 38, 38A or 38B. The storage conveyors operate to temporarily store bags that are discharged at random from the overhead chutes 90 or 90A as sorting of the bags proceeds, and when the storage conveyors are stored to their capacity, signal means is actuated to signal an attendant that it is time to unload the particular storage conveyor involved.

In the embodiments 10 and 10A, each storage conveyor is equipped with its own bag loading conveyor 40 that moves the storage conveyor required to unload it. Apparatus 10B permits a single bag loading conveyor 40B to service a number of storage conveyors 38B, with the operator moving the loading conveyor between bays as required to service their respective storage conveyors.

The chutes 90 and 90A may be equipped to temporarily close off their discharge end portions to temporarily hold mail bags being received from the sortation system from dropping from the chutes. This may be done in any suitable manner.

For all of the embodiments of the invention, the operations of the conveyors may be controlled from control panel 35 by utilizing any suitable wiring arrangement consistent with the manner of operation herein disclosed. The drive of the storage conveyor is equipped with suitable adjustable controls so that the two bag collecting conditions of operation described with respect to same will be operative. Sensing device 94 may be suitably supported from loading dock 12, control panel 35, or the overhead structure 200.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In bulk mail handling apparatus for loading mail bags from a loading dock, to which the mail bags are supplied through an overhead chute above the loading dock, into the load receiving area of an end loading transport vehicle backed into load receiving position adjacent the dock to dispose its end opening to receive the bags, with said apparatus including a conveyor bag loading assembly adapted to be mounted on the loading dock adjacent the load receiving position of the vehicle for movement into and out of the vehicle through its end opening and providing conveyor means extending longitudinally thereof for receiving mail bags and depositing them in the vehicle load receiving area, the improvement comprising:

a mail bag storing conveyor assembly adapted to be mounted on the loading dock and be positioned under the chute, said storing conveyor assembly comprising:

a frame, a conveyor extending longitudinally of said frame for receiving mail bags from the chute and conveying them longitudinally of said frame, means for driving said conveyor to move the bags received thereon longitudinally of said frame, means for detecting mail bag accumulation from the chute on said conveyor, and means for actuating said conveyor drive means in response to bag accumulation detection by said detecting means for driving said conveyor sufficiently to move the bags accumulated thereon a predetermined distance to accommodate receiving additional bags thereon.

2. The improvement set forth in claim 1 wherein:

said storing conveyor assembly further comprises:

means for detecting the mail bag accumulation when it reaches an end of said storage conveyor, and signaling means actuated by the second mentioned detecting means for alerting the operator to unload said conveyor.

3. In bulk mail handling apparatus for loading mail bags from a loading dock loading bay, to which the mail bags are supplied through an overhead chute above the loading dock, into the load receiving area of an end loading transport vehicle backed into load receiving position adjacent the dock to dispose its end opening to receive the bags, with said apparatus including a conveyor bag loading assembly adapted to be mounted on the loading dock adjacent the load receiving position of the vehicle for movement into and out of the vehicle through its end opening and providing conveyor means extending longitudinally thereof for receiving mail bags and depositing them in the vehicle load receiving area, the improvement comprising:

a mail bag storing conveyor assembly adapted to be mounted on the loading dock in alignment with the conveyor bag loading assembly and be positioned under the chute, said storing conveyor assembly comprising:

a wheeled frame, a conveyor extending longitudinally of said frame for receiving mail bags from the chute and conveying them longitudinally of said frame, means for driving said conveyor to move the bags received thereon longitudinally of said frame, means for detecting mail bag accumulation from the chute on said conveyor, and means for actuating said conveyor drive means in response to bag accumulation deflection by said detecting means for driving said conveyor sufficiently to move the bags accumulated thereon a predetermined distance to accommodate receiving additional bags thereon.

4. The improvement set forth in claim 3 wherein:

said storing conveyor assembly further comprises:

means for detecting the mail bag accumulation when it reaches an end of said storage conveyor, and signaling means actuated by the second mentioned detecting means for alerting the operator to unload said conveyor.

5. The improvement set forth in claim 4 wherein:

said wheeled frame is tandem connected to the bag loading assembly at one end of said wheeled frame, said conveyor having its bag load discharge end at said one end of said frame.

6. The improvement set forth in claim 5 wherein:

said wheeled frame one end is connected to said bag loading assembly for support thereby with said conveyor bag load discharge end disposed to unload bags carried thereby onto said bag loading assembly conveyor means.

7. The improvement set forth in claim 4 including:

means for releasably connecting one end of said bag loading assembly to one end of said wheeled frame for moving the latter into and out of the vehicle, said conveyor having its bag load discharge end at said one end of said frame, said end of said conveyor being disposed relative to said bag loading assembly conveyor means, when said wheeled frame is connected to said bag loading assembly, to unload bags carried thereby onto said bag loading assembly conveyor means.

8. The improvement set forth in claim 7 wherein:

said bag loading assembly comprises a wheeled frame, and means for selectively driving said bag loading assembly wheeled frame longitudinally thereof and laterally thereof, whereby, said bag loading assembly may be driven into and out of the vehicle with said storing conveyor assembly connected thereto, and said bag loading assembly may be disconnected from said storing conveyor assembly, when both said assemblies are on the loading dock, and driven sidewise thereof to an adjacent loading bag.

9. The improvement set forth in claim 4 wherein:

said wheeled frame along either side thereof includes bag supporting sides for restraining bags received on said conveyor from movement off same sidewise of said conveyor.

10. The improvement set forth in claim 7 wherein:

said means for releasably connecting said bag loading assembly to said wheeled frame comprises:

a latch arm carried by said bag loading assembly one end and mounted for swinging movement in a vertical plane, a latch bar carried by said wheeled frame at said one end thereof, and means for releasably latching said latch arm to said bar.

* * * * *